Dec. 27, 1938. G. SUNDBACK 2,141,200
MACHINE FOR MAKING FASTENER STRINGERS
Original Filed Sept. 3, 1935 8 Sheets-Sheet 1

INVENTOR.
Gideon Sundback.
BY Kelley & Chisholm
ATTORNEYS.

Dec. 27, 1938.  G. SUNDBACK  2,141,200
MACHINE FOR MAKING FASTENER STRINGERS
Original Filed Sept. 3, 1935   8 Sheets-Sheet 3

INVENTOR.
Gideon Sundback.
BY Kelley + Chisholm
ATTORNEYS.

Dec. 27, 1938.    G. SUNDBACK    2,141,200
MACHINE FOR MAKING FASTENER STRINGERS
Original Filed Sept. 3, 1935    8 Sheets-Sheet 4

INVENTOR.
Gideon Sundback.
BY Kelley + Chisholm
ATTORNEYS.

Dec. 27, 1938.  G. SUNDBACK  2,141,200
MACHINE FOR MAKING FASTENER STRINGERS
Original Filed Sept. 3, 1935  8 Sheets-Sheet 5

INVENTOR.
Gideon Sundback.
BY Kelley & Chisholm.
ATTORNEYS

Dec. 27, 1938. G. SUNDBACK 2,141,200
MACHINE FOR MAKING FASTENER STRINGERS
Original Filed Sept. 3, 1935 8 Sheets-Sheet 6

INVENTOR.
Gideon Sundback.
BY Kelley & Chisholm
ATTORNEYS

Patented Dec. 27, 1938

2,141,200

UNITED STATES PATENT OFFICE 2,141,200

MACHINE FOR MAKING FASTENER STRINGERS

Gideon Sundback, Meadville, Pa., assignor to Talon, Inc., a corporation of Pennsylvania Application September 3, 1935, Serial No. 38,944
Renewed January 20, 1938

21 Claims. (Cl. 153—1)

My invention relates to machines for making fastener stringers and generally the object is to provide improvements in the machine of my prior Patent No. 1,467,015, granted September 4, 1923. More particularly the objects of my invention are to provide a machine capable of operation at higher speeds than heretofore known with a minimum of vibration; to provide a machine which is relatively simple so that the cost of making the machine and of keeping it in order is as low as possible; and to provide a machine wherein the shape of the fastener members themselves and their spacing on the tape, are accurate and uniform.

My improved machine embodies means for cutting fastener element blanks preferably by slicing them from a wire which has been previously rolled to a generally Y-shaped cross-section, as disclosed in my prior patent, above referred to. The machine has a single forming die and the fastener member blanks are transferred from the slicing knife to the forming die by positive movement. The forming die is carried by a reciprocable slide in which the fastener member blank is die formed during its movement toward the position where it is attached to the tape.

The tape guiding and feeding devices have novel characteristics which make for uniformity of position of the fastener members on the tape and which completely solve the problem heretofore encountered in previous machines of accurately locating the first fastener member of a group after a jump feed of the tape. The fastener member itself is under control in a novel manner during its formation so that the fastener members are uniformly well shaped and the forming die and punch have associated therewith means for rounding sharp outside corners throughout the length of the fastener members. The machine has only two reciprocating parts of any considerable weight and these operate in substantially the same straight line and in opposite directions so that one counterbalances the other.

In the accompanying drawings I have shown for purposes of illustration, one embodiment which my invention may assume in practice. In these drawings.

Power is delivered to the machine from any suitable motor through a belt connection 1 to the main shaft 2, which carries suitable gears for driving the various mechanisms of the machine in properly timed relation. A bevel gear 3 on one end of the main shaft meshes with a bevel gear 4 on a cross shaft 35, which operates the cutting slide 5 through a crank pin 6 and adjustable link 7. The other end of the main shaft carries the bevel gear 8 and meshes with the bevel gear 9 on a short cross shaft 36 which operates the transfer slide 10 through a crank pin 11 and adjustable link 12.

Figures 12, 13:
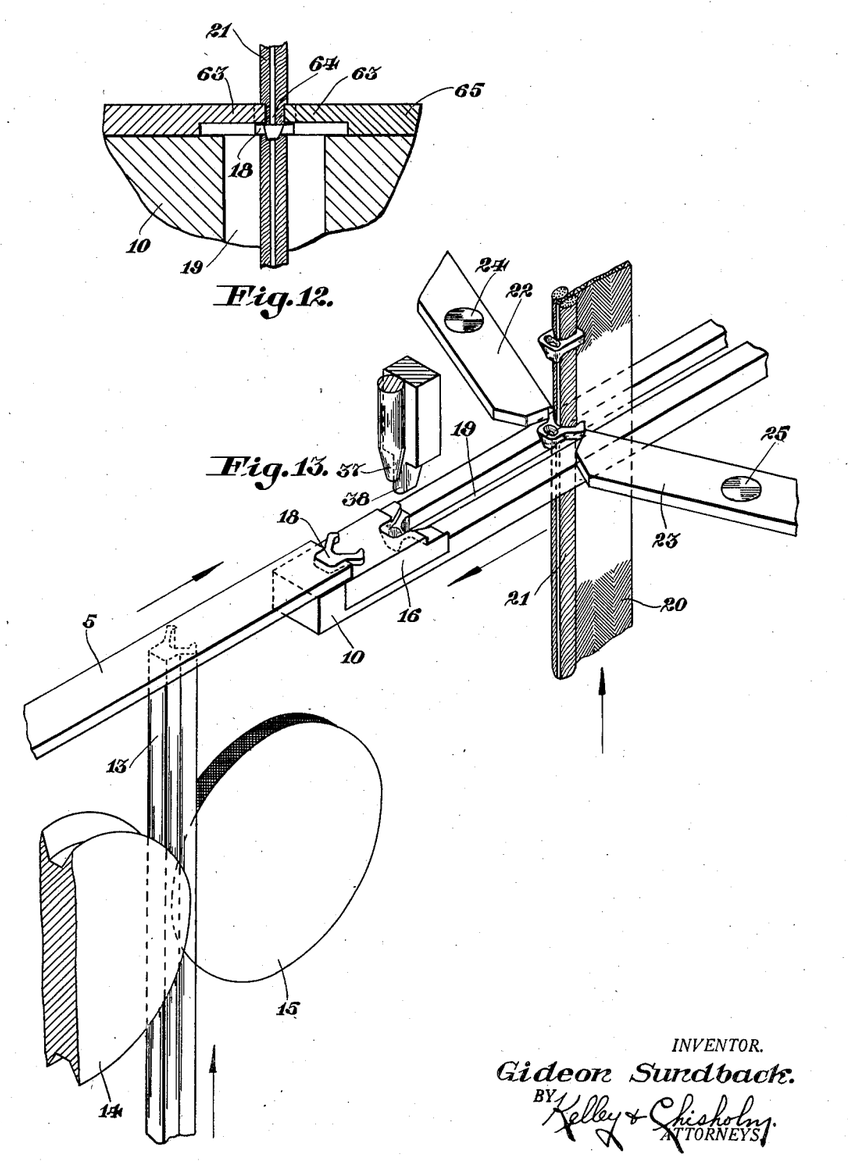
Fig. 12 is a detail cross-section on line 12—12 of Fig. 2.
Fig. 13 is a schematic view to illustrate certain portions of the machine.

Referring now briefly to Fig. 13 the metal is fed to the machine in the form of a continuous wire 13 of generally Y shape cross-section suitable for forming the fastener members. This wire is fed intermittently upwardly by the friction rollers 14, 15. The cutting slide 5 cuts off a slice from the end of this wire just thick enough for a fastener member blank and transfers it horizontally to a position directly over the forming die 16 mounted in the transfer slide 10. The forming punch 37 by quick movement positively moves the fastener member blank, herein designated 18, from the cutting slide to the forming die and then during the movement of the transfer slide 10 it cooperates with the die to die form the fastener member blank. The transfer slide has a centrally located elongated slot 19 through which the tape 20 with its corded edge 21 is fed upwardly. The transfer slide forces the fastener member jaws astride the corded edge of the tape stringer and at the same time, strikes the clamping tools 22, 23 and forces them around their pivots 24, 25, respectively, whereby the ends of the clamping tools will come close together and press against the edges and legs of the fastener member and squeeze it on the tape.

A brief detailed description of the various mechanisms will now be given. The metal feed mechanism is similar to that shown and described in my prior Patent 1,467,015 above referred to. It is sufficient to say here that suitable ratchet and pawl mechanism is provided for intermittently actuating the feed rolls 14, 15, such mechanism being driven from the cylindrical cam 26 on the main shaft of the machine and the follower 27. The wire is fed upwardly through an opening in the cutting die 28, which is rigidly held in the bed plate 29 of the machine. A knife die insert 30 is removably fastened to the die 28 by suitable screws 31.

The knife die insert is recessed at its front side to fit around and into the channel of the wire, and the top edge of this insert is ground to a cutting edge. The knife slide reciprocates in a suitable guideway and carries at its front end the cutting knife 32, which is removably held in the slide by a suitable screw 33. The cutting knife is adapted to fit around the outside of the wire and is provided with a cutting edge at its lower side which cooperates with the cutting edge of the knife die to slice or cut a fastener member blank from the wire. This cutting knife is of this shape so as to frictionally hold the fastener member blank while it is being transferred to the forming die in the slide 10. It will be observed that the form of the cutting die and the form of the cutting knife are the reverse from the ones shown in Patent 1,467,015. In this manner the burr which is left on the fastener member blank is at the bottom side on the head end of the blank, so that it is broken down as the fastener member is formed in the forming die 16, according to the principle disclosed and claimed in the patent to Lamb No. 1,817,990.

After a fastener member blank such as indicated at 18 has been severed, the knife slide carries it to a position directly over the forming die 16. The construction and timing of the two slides are such that the fastener member blank is disposed directly over the forming die when the slides are at their innermost positions, where for the moment, there is no relative movement between the slides.

Figure 1:
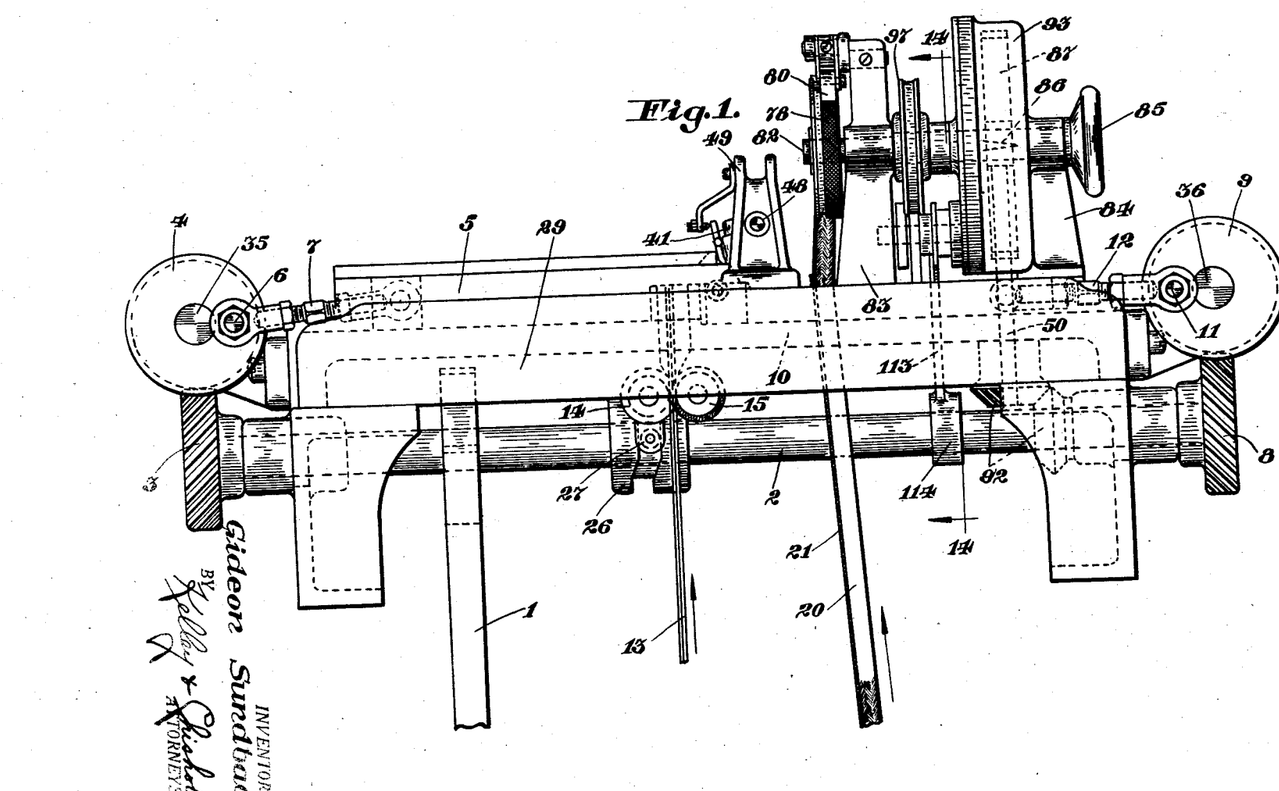
Fig. 1 is a front elevation view of the machine.
Figure 2:
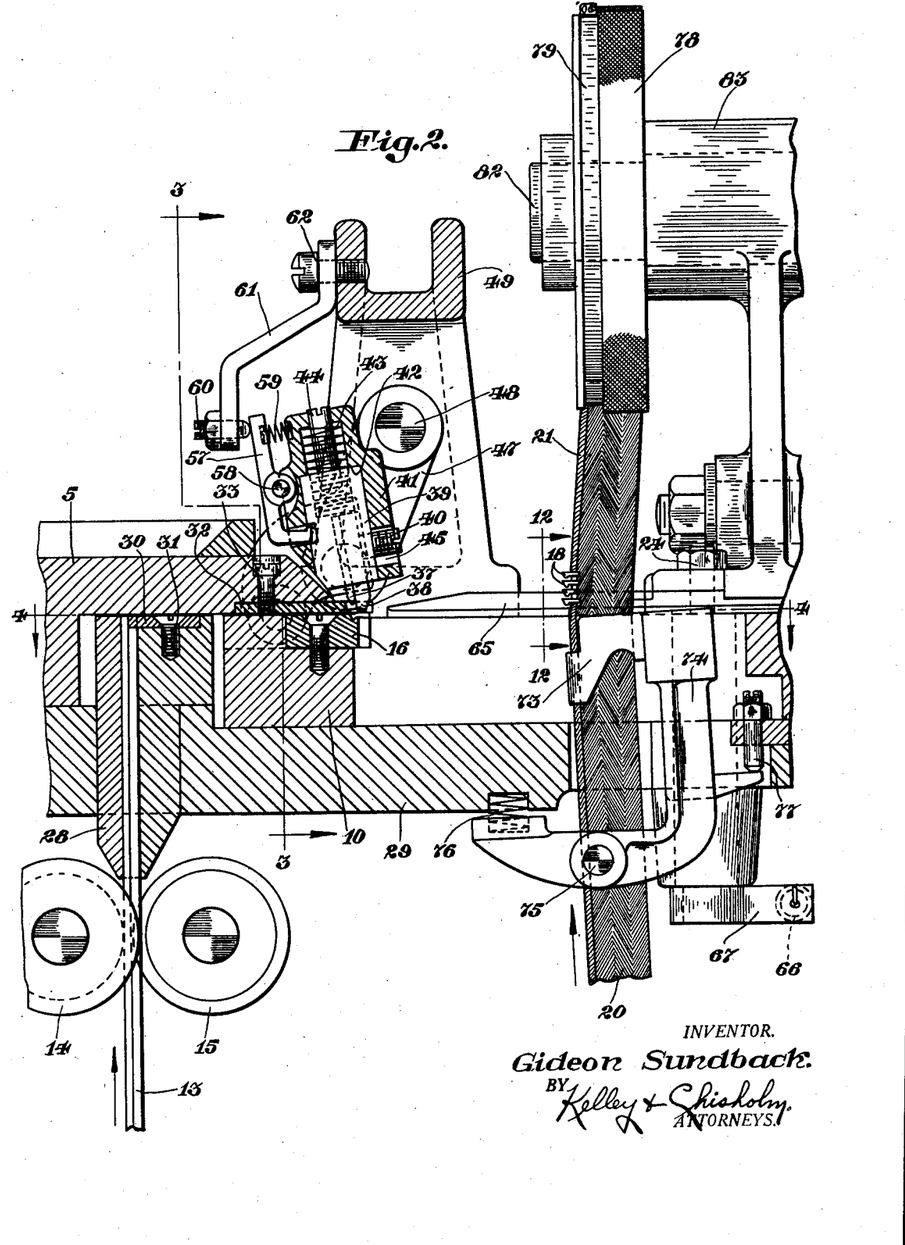
Fig. 2 is a vertical cross-section through the principal working parts of the machine.

The forming punch, its holder and mechanism, will now be described. These parts are best shown in Figs. 2, 3, 10 and 17. The forming punch 37 and its associated guiding and controlling member are adjustably clamped together in a cylindrical holder 39 by means of suitable screws such as indicated at 40 and 44. This cylindrical holder is reciprocably mounted in the bore of the punch holder housing 41 as shown in Fig. 2, at its uppermost position. The end of the punch holder bears against an internal shoulder 42 in the punch holder housing. A spring 43 is mounted in a recess at the end of the punch holder housing and normally urges the punch holder downwardly but the downward movement is limited by the screw 40 which moves in the slot 45 of the punch holder housing. This punch holder housing carries supporting trunnions 46 on opposite sides and these trunnions are connected through links 47 to the stationary bearings 48 by which the entire punch holder mechanism is supported on the stationary yoke 49, which straddles the slides and is anchored on each side to the bed plate of the machine.

That portion of the punch holder housing which is on the axis of the trunnions 46 swings in an arc about the axis of the pivots 48. The angular position of the punch holder housing relative to the axis 46 is controlled by a pivotal connection with the transfer slide 10. This connection is provided by means of suitable lugs 51, 52, on opposite sides of the punch holder housing which extend between sets of lugs 53, 54, respectively, on the slide 10 and are connected by pins 55, 56.

Figures 3, 5, 6, 7, 8, 8X, 9:
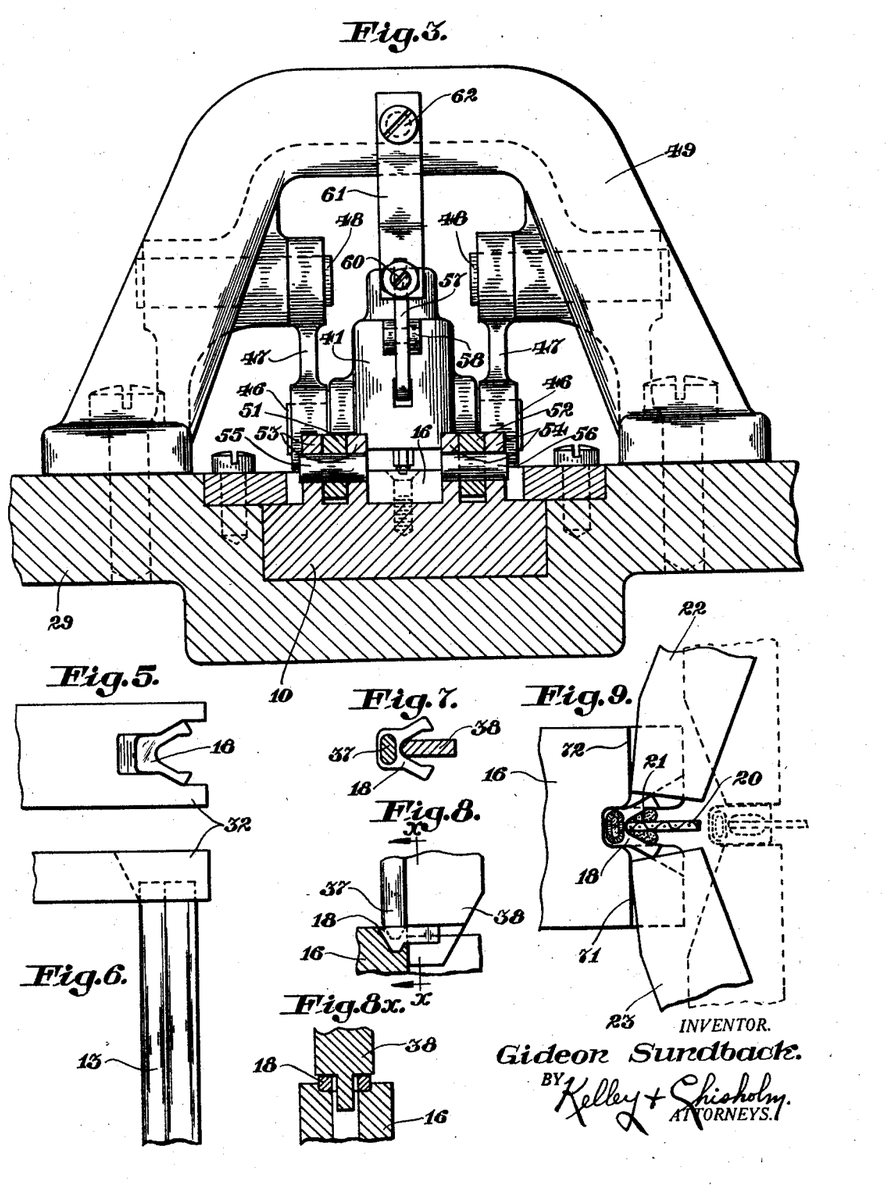
Fig. 3 is a vertical cross-section on line 3—3 of Fig. 2.
Figs. 5 and 6 are detail plan and elevation views respectively of the cutting knife operating to cut the fastener member blank.
Figs. 7 and 8 are horizontal sectional and elevational views respectively illustrating the forming punch and associated parts.
Fig. 8x is a vertical cross section on line x—x of Fig. 8.
Fig. 9 is a horizontal sectional view showing a detail of the parts for attaching fastener members.
Figures 4, 17:
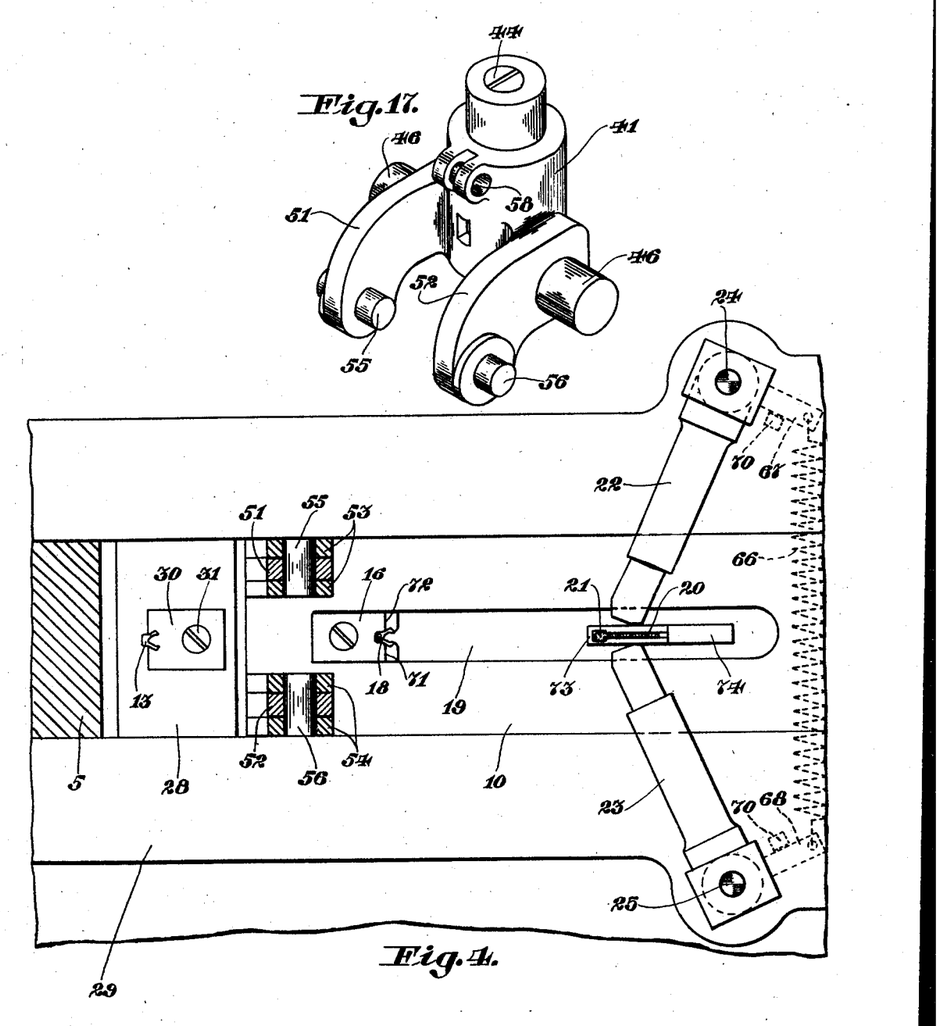
Fig. 4 is a horizontal cross-section on line 4—4 of Fig. 2.
Fig. 17 is a perspective view of the punch holder housing.
Figure 11:
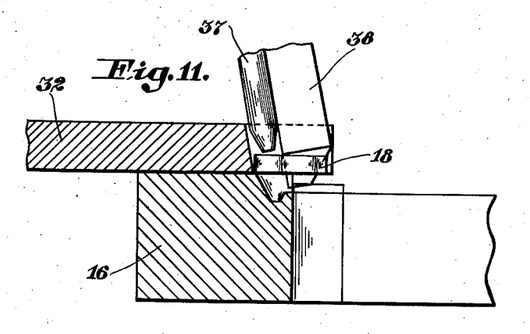
Fig. 11 is a detail view on an enlarged scale showing the initial position of the parts in Fig. 10.

As a result of what may be termed the three point control of the punch holder housing the punch will be caused to assume various relative positions with respect to the forming die 16. If we describe the parts in the position shown in Fig. 2 the cylindrical punch holder is being held at its innermost position in the punch holder by the catch 57 pivoted at 58 and held in place by spring 59. The slides are just approaching their innermost positions and the catch 57 has come against the adjustable stop 60 on the bracket 61, which is attached to the yoke 49 by bolt 62. The stop screw 60 is accurately adjustable so that the punch holder may be tripped at the desired time. When the punch holder is released from the catch 57 the spring 43 will force it quickly downwardly relative to the punch housing so that the punch 37 will strike against the fastener member blank 18, which is being frictionally held within the end of the knife slide, as can best be seen in Figs. 5 and 11. By this action of the punch the fastener member blank will be ejected from the cutting knife into the forming die and it will be guided and accurately controlled in its movement by the member 38, which comes between the jaws or legs of the fastener member blank, as shown in Figs. 7 and 8. The force of the spring 43 is, however, not sufficient to die form the fastener member blank but the die forming is completed during the movement of the transfer slide 10 toward the tape 20.

Figure 10:
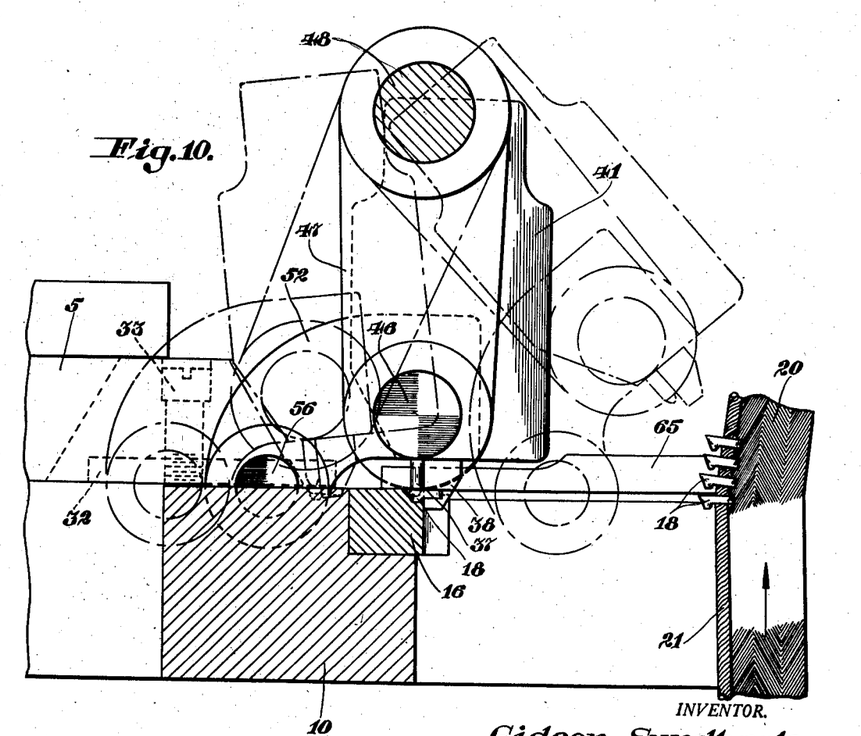
Fig. 10 illustrates in vertical section various positions of the forming punch and associated parts.

Leaving the position shown in Fig. 2, the cutting slide 5 retracts to the left and it will be seen that as the transfer slide 10 moves to the right, as shown in Fig. 10, the punch holder housing will swing in an arc about the pivot 48 and since it is connected to the slide close to the forming die, the forming punch will follow very closely the forming die. Likewise during this movement there will be a clockwise return revolution of the punch holder housing so as to bring the forming punch into a vertical position when the parts have moved to approximately the central position. The punch holder housing will be forced relatively downwardly and when the links 47 approach approximately a vertical position the punch holder will strike against the internal shoulder 42 of the housing and continued movement of the parts will cause positive pressure to be exerted through this shoulder to the punch holder and punch. It is this pressure which completes the die forming of the fastener member. In Figs. 8 and 8x it will be observed that the die has recesses which receive the end of the fastener member blank opposite the projection and recess and that the internal corners of these recesses are rounded. The guide member 38 which moves with the punch has shoulders adapted to exert pressure upon the bifurcated end of the fastener element and press it into the die, thus rounding the outer corners of the fastener member blank throughout the length of the bifurcated end. The die forming position of the parts is illustrated in Fig. 10 in solid lines. When the punch holder is at this innermost position the spring catch 57 will again snap into retaining position.

Upon continued movement of the slide the parts will assume some such position as illustrated at the right hand side in dotted lines in Fig. 10. The punch holder housing as a whole will lift upwardly and outwardly relative to the forming die so as to lift the punch and the retaining member 38 from the fastener element. At the same time there will be a relatively anti-clockwise revolutionary movement of the punch holder housing. Upon return of the slide 10 the parts will again assume the position shown in Fig. 2, where the punch will be tripped to forcibly eject the next fastener member blank from the cutting knife into the forming die.

The continued movement of the slide 10 after the forming operation brings the fastener member with its jaws foremost to the tape 20. During this movement after the punch has been lifted the fastener member is still held firmly in the die by the overhanging portions 63 on opposite sides of the slot 64 in the stationary plate 65, see Fig. 12. The slot 64 is sufficiently wide to permit the lifting of the fastener member after the jaws have been closed together but not sufficiently to allow it to move before the jaws are firmly clamped about the tape. The tape 20 feeds upwardly through the slot 19 of the slide 10 between the pivoted clamping tools 22, 23. The tools are normally held in the position shown in Fig. 4 by the suitable tension spring 66 connected between the arms 67, 68 on the pivoted clamping tools. Suitable stops 70, 70 may be provided for limited return movement of the clamping tools.

When the parts approach the position shown in Fig. 9 the fastener member has been forced astride the beaded edge of the tape and the shoulders 71, 72 strike against the clamping tools causing them to swing inwardly against the jaws or legs of the fastener member. Continued movement of the transfer slide to its final position will cause movement as a unit of the transfer slide, the forming die, the fastener member, the tape, and the clamping tools to the dotted line position shown in Fig. 9. In that position the clamping tools have swung into substantially a straight line whereby they have pressed the jaws of the fastener member together to clamp it firmly on the beaded edge of the tape. During the return movement of the transfer slide the side tools will again swing to their open position and the tape will return to position with them carrying the fastener member clamped thereto.

The tape guiding and controlling mechanism will now be described. Referring to Fig. 2 the tape passes through a suitable friction guide 73 which is supported on the bracket 74 pivoted at 75 to the frame of the machine. The spring 76 normally forces the bracket and tape guide to its innermost position which is controlled by the adjustable stop pin 77. It will thus be seen that a constant pressure of the tape between the jaws of the fastener member is maintained and this pressure is adjustable which makes for uniformity of the positions of the fastener members along the beaded edge of the tape.

The tape passes upwardly around a narrow drum 78 which has a groove 79 for accommodating the corded edge of the tape and the fastener members. The tape passes over the drum and is held in contact with it by the friction shoe 80 pivotally mounted to the frame of the machine at 81. The drum is connected to a shaft 82 which is mounted in suitable bearings in the standards 83 and 84 and the shaft carries at its opposite end a hand wheel 85. The drive for the shaft 82 and tape feed drum is a continuous drive through the worm gear 86, 87 respectively. The worm gear has a one way drive connection with the annular driven member 88, which is connected to the shaft 82 at 89. The connection between the gear wheel and the driven member may be of any well known form and as shown herein, comprises rollers 90 in tapered openings 91 between the gear and driven member. The worm 86 is connected to a vertical shaft 50 which is driven from the main shaft by a pair of bevel gears 92. This continuous feed mechanism is so designed and timed as to feed the tape upwardly, and mounted axially to the spacing of the fastener members of a group on a fastener stringer.

Provision must be made for imparting a quick movement to the feed drum, sometimes termed a "jump feed movement". It may be pointed out at this time that the operation of the jump feed does not interfere in any way with the regular feeding movement and when the jump feed comes into play it merely carries the driven member 88 in the gear housing 93 forwardly ahead of the gear member 87, which is permitted by the one way driving connection between the gear and member 88.

Figure 14:
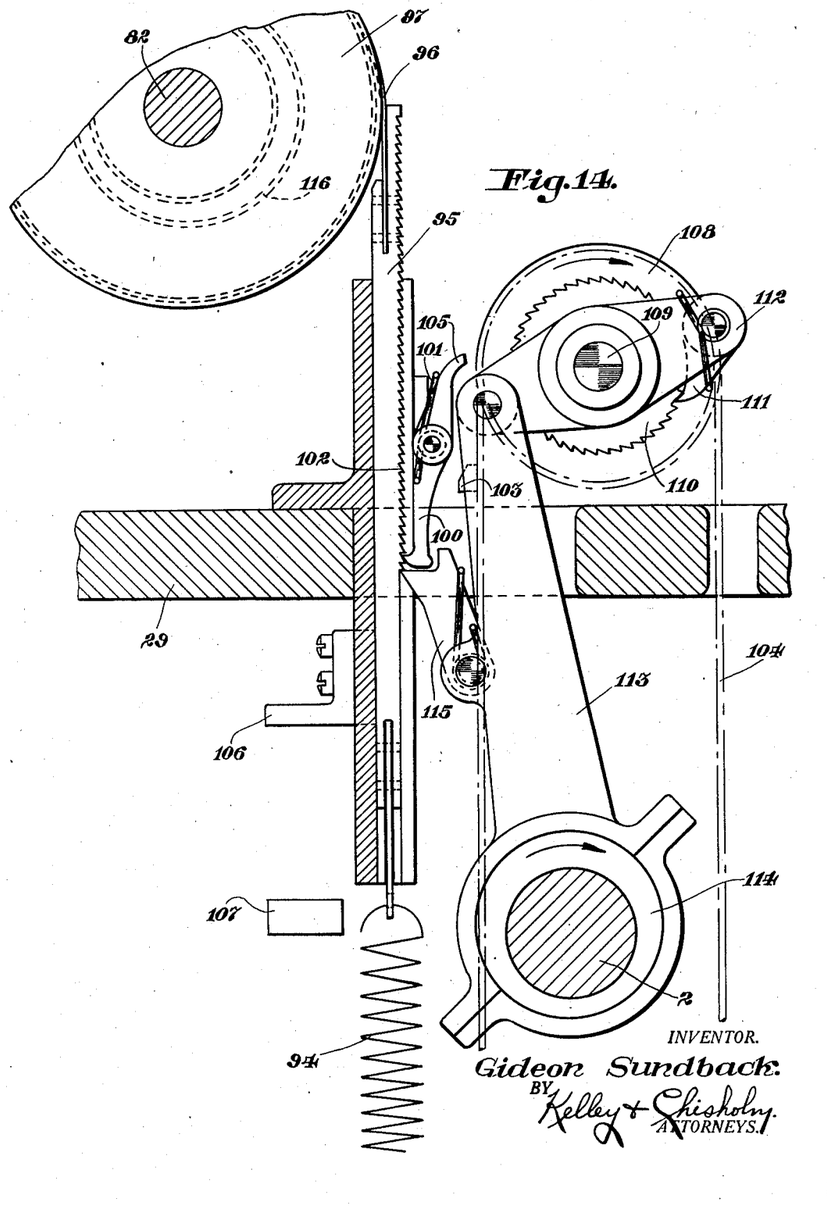
Fig. 14 is a vertical cross-section on line 14—14 of Fig. 1 showing the jump feed mechanism.
Figures 15, 16:
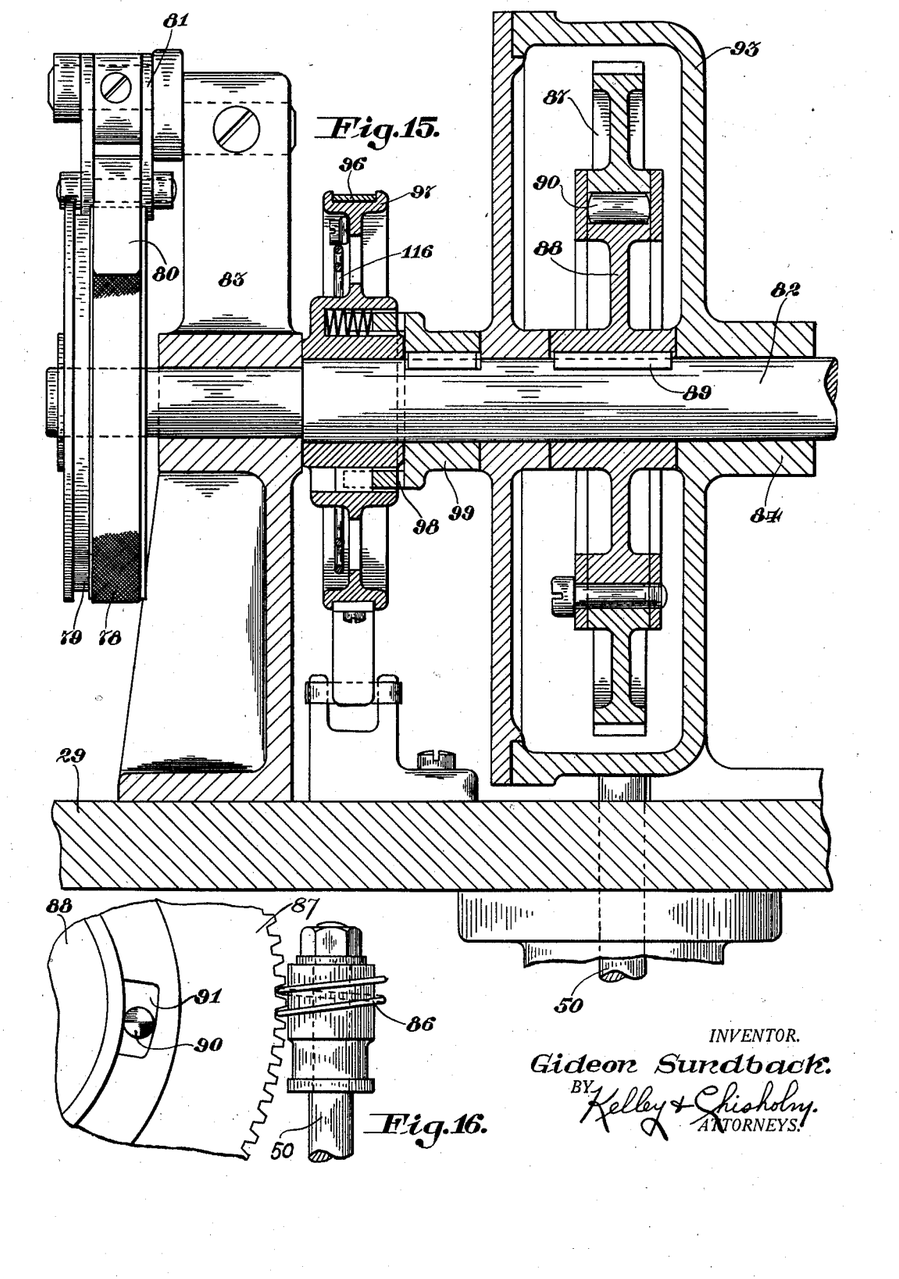
Fig. 15 is a vertical central section through the tape feeding mechanism.
Fig. 16 is a fragmentary detail view at right angles to Fig. 15.

When the machine is operating at a high speed it is desirable to return the jump feed operation as rapidly as possible, in order that the fastener member forming and feeding mechanism will not have to be interrupted. The jump feed is controlled preferably by the aid of a powerful spring or rubber tension member indicated at 94, connected through the sliding link 95 to a flexible band 96. The band 96 passes over a drum 97 surrounding the shaft 82 and has a suitable connection 98 to the collar 99 which is keyed to the shaft 82. When the spring 94 is released it will very rapidly rotate the drum 97 in a clockwise direction, as viewed in Fig. 14, causing a rapid rotation of the shaft 82 independently of the drive through the gear wheel 87. This imparts a jump feed to the tape which provides for spacing between groups of fastener members on the fastener stringer.

The control of the jump feed mechanism will now be described. In the position shown in Fig. 14 just before the jump feed is about to be tripped, the spring is being held under tension by the pivot pawl 100, held by the spring 101 against the teeth 102 on the vertical link 95. It will be held in this position until the cam or lug 103 on spacing control belt 104 strikes against the extension 105 on the pivoted pawl, causing it to be released from the teeth 102. This allows the heavy spring 94 to impart a quick rotation to the drum 97 and the tape feed drum 78. The sliding link 95 carries a stop lug 106 which is adapted to strike against a suitable abutment such as a block of rubber 107. The shaft 82 thus comes quickly to a stop and the feed movement is again taken up through the gear 87 and ratchet member 88.

The control belt 104 may have any suitable form but preferably is adjustable in length. It may, if desired, be a chain of links passing through a sprocket wheel 108, which is mounted on the auxiliary shaft 109. This shaft carries a ratchet 110 with which engages a pawl 111 on the lever 112. The other end of this lever is connected through a link 113 with an eccentric 114 on the main shaft 2 of the machine. The length of the belt and size of the wheel over which it passes as well as the number of teeth in the ratchet 110 will determine the timing of the cam 103 relative to the pawl 100. By varying the length of the belt or the positions of the cams 103 thereon or by varying the number of the teeth in the ratchet, any desired length of fastener may be obtained. At each revolution of the machine the control belt will advance a certain predetermined amount and after a predetermined number of revolutions of the machine which will be required to make the desired length of fastener stringer, the cam 103 will operate to trip the pawl 100.

Mechanism is provided for reloading the spring 94. This is accomplished by a supplementary pawl 115 pivoted to the link 113, which engages the teeth 102 and after a few revolutions of the machine this pawl operating in conjunction with the retaining pawl 100 will lift the rack 102, thus reloading the spring. During this lifting movement the drum 97 is retracted to its original position by a suitable coiled spring member 116, mounted between the drum 97 and the ratchet member 98.

It will be apparent that a jump feed movement will occur very quickly providing a sufficiently strong spring 94 is used. It will also be evident that this jump feed will occur immediately if the cam 103 is moved against the pawl 100. The operation of the cam is intermittent and is controlled by the pawl 111 operated by the eccentric 114 by properly connecting the eccentric on the shaft 2. Therefore, it will be seen that the pawl 111 may be made to do its work in the first interval between attachments of fastener members on the tape. By this means it is possible to make the jump feed occur during the first quarter or half of the interval between successive attachments of fastener members and during the remaining portion of this interval the continuous feed will have sufficient time to correct the tension on the tape between the feed drum and the point of attachment of the fastener members. It will readily be seen that such operation will be needed due to the inertia of the tape and its attached fastener members together with the associated feed drum and shaft when the jump feed mechanism is brought suddenly to a stop.

The construction and operation of the machine will now be apparent from the above description. The machine is capable of operation at relatively high speeds with a minimum vibration. At the same time, it is relatively simple and easy and cheap to manufacture and keep in operation.

While I have shown and described in this application one embodiment which my invention may assume in practice, it will be understood that this embodiment is merely for the purpose of illustration and description and that various other forms may be devised within the scope of my invention as defined in the appended claims.

What I claim as my invention is:

1. In a machine of the class described, a cutting tool for cutting fastener member blanks, a forming punch and forming die for die forming the fastener member blanks, said cutting tool being movable from cutting position to a position directly opposite the forming die, said forming punch being movable to eject said blanks from said cutting tool and move them into said forming die.

2. In a machine of the class described, a cutting tool for cutting fastener member blanks, a forming punch and forming die for die forming the fastener member blanks, said cutting tool being movable from cutting position to a position directly over said forming die and being adapted to transfer said blanks to the position over said forming die, said forming punch being movable from a position above said cutting tool and being adapted to eject the fastener member blanks from said cutting tool and move them into said forming die.

3. In a machine for making fasteners of the class described, a forming die, a tool for moving fastener member blanks into a position directly over said die, a forming punch, and means for imparting a quick movement to said punch for ejecting a fastener member blank from said feeding tool to said forming die, and means for imparting a slower relative movement to said punch for die forming said fastener member blank.

4. In a machine for making slide fasteners, a reciprocable slide, a forming die carried thereby, means for feeding fastener member blanks to said forming die while the slide is at one of its terminal positions, means operating in conjunction with said forming die for die forming said blanks while in said die, and means for attaching said fastener blanks to a stringer at the opposite end of said slide movement.

5. In a machine for making fasteners of the class described, the combination defined in claim 4 wherein the means for die forming said fastener member blank operates during the movement of said slide from the blank receiving position to the fastener member attaching position.

6. In a machine of the class described, a reciprocable first slide, a forming die carried thereby, a reciprocable second slide having means for feeding fastener member blanks to a position directly over said forming die, said reciprocable slides being mounted in approximately the same line, and means for operating said slides in unison toward and away from each other in such a manner that the action of one slide tends to counterbalance the action of the other slide.

7. In a machine for making slide fasteners, a reciprocable slide, a forming die carried thereby, a forming punch mounted directly over said die, a holder for said punch having a connection with said slide whereby said punch is moved in unison with said slide, and means for forcing said punch toward said die during the movement of said slide to die-form a fastener member blank in said die.

8. In a machine for making slide fasteners of the class described, a reciprocable slide, a forming die carried thereby, a punchholder having a pivotal connection with said slide, a punch mounted in said punchholder over said forming die, a link forming a connection between said punchholder at a stationary point above said slide whereby said punchholder and punch are forced toward said die by a toggle action upon movement of said slide to die form a fastener member blank in said die.

9. In a machine for making slide fasteners of the class described, a forming die adapted to receive a fastener member blank therein, a forming punch mounted above said die, said punch carrying means for forming a pocket at one end of a fastener member blank, and said die having means for forming a projection on the fastener member blank opposite said pocket, said die having also recesses with rounded internal corners to receive the opposite or bifurcated end of the fastener member blank, and means associated with said punch for exerting pressure on said bifurcated end to force it into said recesses of the die.

10. In a machine for making fasteners of the class described, the combination with intermittently operating fastener member supplying and attaching means, of means for supporting a flexible stringer in the desired position with relation to said attaching means, means for imparting a short feeding movement to said tape in the interval between successive attachments of fastener members to space the fastener elements uniformly on the stringer, and means for imparting a long jump feed to said tape after a predetermined number of fastener elements have been attached to the tape to provide spaced groups of fastener members, said jump feed means operating during the first portion of the interval between successive attachments of fastener members whereby said normal short feed will operate to correct the tension on the tape before attachment of the first fastener member in the next group after said jump feed.

11. In a machine for making fasteners of the class described, means for supporting a flexible tape stringer including a tape guide, means for forcing fastener members against the edge of said stringer adjacent said guide, said guide being mounted for limited transverse movement in the plane of said tape, a spring acting on said guide to urge it to its inward position whereby only a predetermined pressure of said fastener member against said tape will cause said tape guide to yield.

12. In a machine for making fasteners of the class described, a reciprocable slide having a slot therethrough extending lengthwise thereof for a substantial portion of the length of said slot, means at one end of the slide in longitudinal alignment with said slot for holding a fastener member with its bifurcated end extending toward said slot, means for feeding a tape transversely of said slide through said slot, and means for guiding the tape through said slot in the path of said fastener member whereby movement of said slide will bring the fastener member to a position astride the edge of the tape.

13. In a machine for making slide fastener stringers, means for guiding and holding a length of tape under tension, means for longitudinally feeding said length of tape, movable clamping tools on opposite sides of said tape, means for successively feeding fastener members transversely relative to the tape and astride the edge of said tape between said clamping tools, said clamping tools being located in the path of movement of said fastener member feeding means and said tape being located in the path of the fastener member in said feeding means whereby said fastener member feeding means will engage said clamping tools and clamp the fastener member on the tape and whereby said tape will be simultaneously transversely moved.

14. In a machine for making slide fastener stringers, means for supporting and guiding a length of tape under tension, a carrier for feeding fastener members to the edge of said tape, a stationary slotted plate over said carrier for holding said fastener member in position in said carrier, said clamping tools mounted for swinging movement on opposite sides of said fastener member, said carrier engaging said clamping tools to swing them against the edges of said fastener member whereby said fastener member is clamped on the edge of said tape, the slot in said stationary slotted plate being sufficiently narrow to engage the sides of said fastener member during the clamping operation, and sufficiently wide to permit movement therethrough of the attached fastener member and tape when the carrier and clamping tools are withdrawn.

15. In a machine for making fastener stringers, a pair of reciprocable slides mounted for sliding movement in the same plane, means for reciprocating said slides with the same period of reciprocation, one of said slides adjacent one end having means for holding a fastener member blank and the other of said slides at one end having a forming die, such ends of said slides at one position in their period of reciprocation overlapping, a movable punch mounted over said overlapping ends, means for actuating said punch when said slides are approximately at their innermost overlapping position to move a fastener member blank from said holding means to said forming die.

16. The combination defined in claim 15 and means forming an operative connection between said punch and said slide carrying the forming die whereby said punch will move with said forming die upon movement of said slide, and means for further actuating said punch during such movement to die form said fastener member blank.

17. In a machine for making fastener stringers, a movable carrier, a forming die on said carrier, and means for feeding fastener member blanks to said forming die, a punchholder having pivotal connection with said carrier and also having a link connection to a stationary part of the machine whereby movement of said carrier will effect movement of said punch toward said die while maintaining the same in substantially vertical alignment therewith.

18. The combination defined in claim 17 wherein the punch is slidably mounted in the punchholder and wherein retaining means is provided on said punchholder for retaining said punch retracted in said holder, a spring in said holder adapted to actuate said punch, and means for releasing said retaining means whereby said punch is quickly actuated relative to said holder to transfer a fastener member blank to said forming die.

19. In a machine for making fasteners of the class described, the combination with intermittently operating fastener member supplying and attaching means, means for supporting a length of tape under tension in the desired position with relation to said tape, means for normally imparting a continuous lengthwise movement to said tape whereby in the interval between successive attachments of fastener members the tape will move sufficiently to space the fastener elements properly on the stringer, and means for imparting at predetermined intervals a relatively long jump feed to said tape to group the fastener members on the stringer, said jump feed mechanism operating during the first half of the interval between successive attachments of fastener members whereby the continuous feed will operate to correct the tension on the tape between attachment of the first fastener member on the next group after a jump feed movement.

20. In a machine for making fasteners of the class described, means for supporting a tape under tension including a tapeholder, means for feeding fastener members against the edge of said tape adjacent said holder and for applying force through said fastener member against the tape to move said tape and tapeholder, a spring acting on said tapeholder for controlling its movement, and means for regulating the tension of said spring to regulate the pressure between said fastener member and tape.

21. In a machine for making slide fasteners a movable die holder, a forming die carried thereby, a punch holder connected to said die holder and movable therewith as a unit, a forming punch mounted in said punch holder over the die, and means for forcing the punch toward the die during movement of the die holder to die form a fastener member blank in said die.

GIDEON SUNDBACK.